3,523,029
HOT MELT HIGHWAY MARKING COMPOSITION
Charles Edwin Searight and John Robert Ryan, Jackson, Miss., assignors to Cataphote Corporation, Jackson, Miss., a corporation of Ohio
No Drawing. Filed Aug. 21, 1967, Ser. No. 661,833
Int. Cl. C08h 11/04, 17/34
U.S. Cl. 106—237  3 Claims

ABSTRACT OF THE DISCLOSURE

A thermoplastic composition suitable for use as a hot melt highway marking composition comprising a mixture of a high molecular primary alcohol, an acidic rosin derivative, and glass beads or pigments or fillers or mixtures thereof. The high molecular weight alcohol, is hydroabietyl alcohol, stearyl alcohol, cetyl-stearyl alcohol, cetyl alcohol, n-hexacosyl alcohol, n-octacosyl alcohol or n-triacontyl alcohol. The rosin derivative is abietic acid, the maleic acid adduct of abietic acid, hydrogenated rosin, dehydrogenated rosin, rosin ester gums, maleic anhydride modifications of rosin ester gums, phenol-formaldehyde condensate modifications of ester gum or metal resinates.

---

The present invention relates to thermoplastic resin mixtures which are especially adapted for hot melt application as highway marking stripes. In particular, the thermoplastic resin mixtures of this invention are suitable for production of thick stripes containing glass beads for reflex reflectance effect. Generally speaking, the invention is concerned with thermoplastic resins which are an unreacted combination of high molecular weight alcohols with rosin or acidic rosin derivatives.

In the field of highway safety, hot melt markings, and particularly hot melt markings containing glass beads, are assuming a prominent position. In order to assure a degree of permanence which would justify their use in lieu of ordinary paint, the hot melt markings must possess certain properties, including rapid solidification, good reflectance, good bond strength, high impact resistance, resistance to ultra-violet light degradation, and low tackiness at ambient temperatures. From the standpoint of the application of the hot melt markings, they must emit no injurious fumes from the melt while in the molten condition, and must be stable at application temperature. That is, the viscosity must not rise when the compositions are held at the application temperature over long periods of time. Further, such compositions must be stable under conditions of reheating, and maintain a good flow ability.

Prior to the present invention, hot melt highway markings have been made using rosin derivatives including natural rosin, ester gum, rosin maleics, rosin modified phenolics, ethyl cellulose, etc., plasticized with various oils such as blown castor oil or permanent plasticizers. In some cases 100 percent solid alkyd resins have been used. All of these systems suffer from many defects, such as ultra-violet light instability, heat instability, and high price. The ultra-violet light instability is reflected in a change of color when placed outdoors. The heat instability, on the other hand, is evidenced by a substantial and deleterious increase in viscosity when the resin is held at the application temperatures for the extended periods of time which are required in order to apply markings to a highway.

The compositions of this invention overcome the aforesaid disadvantages of the prior art. This invention provides highway marking compositions which will give a good bond to concrete or asphalt highway surfaces. These marking compositions have extremely low viscosities at the application temperature, with resulting good flow properties, and are thus easy to or convenient to apply to highways. Once applied, they are long lasting, in that they provide a good bond to concrete or asphalt, are stable to ultra-violet light, ozone, and other atmospheric conditions which they may encounter, have high hardness and impact resistance, and are consequently not tacky at ambient temperature conditions.

More specifically, our new compositions provide outstanding viscosity stability at melting temperatures, even over long periods of time for temperatures above 425° F. Viscosities of the order of 1,000 to 10,000 cps. measured at 400° F. can be maintained for four hours or more at temperatures of 450° F., in air, even in the presence of filler loadings of 85 to 90 percent. Such low viscosities enable the compositions of this invention to be applied at high rate and provide excellent wetting of the substrate, which assists in achieving good adhesion. The temperature stability assures that the material will retain all of its desirable properties throughout repeated and/or long heating periods. After application, the highway marking compositions of this invention have high impact strength, good low temperature flexibility, controlled creep, high stability to ultra-violet light, and essentially no tack at ambient temperatures.

The resinous binder of the present invention comprises an essentially unreacted mixture of rosin or acidic rosin derivatives, and a high molecular weight primary alcohol. It is generally recognized that when an acid and an alcohol are mixed, and heated, usually an esterification or condensation reaction occurs which produces an additional product which is generally quite dissimilar to the original materials. The use of high molecular weight alcohols with rosin or its derivatives in hot melt systems has been generally considered impractical, since the expected esterification reaction would lead to material too viscous to be useful in a hot melt coating. Such a condensation reaction would lead to a polymerized rosin system of high viscosity, with viscosity properties totally different from the viscosity properties of the simple mixture.

For instance, the maleic acid adduct of rosin is the addition product of abietic acid and maleic acid, which theoretically is a tribasic acid, and which has a high acid number. If this adduct is heated with a high molecular weight alcohol such as hydroabietyl alcohol, especially in the presence of calcium carbonate, one would expect that an esterification reaction would occur which would lead to at least a 3-fold increase in molecular weight, with an accompanying increase in melt viscosity, increase in melting point, increase in hardness, loss of flexibility, loss of adhesion, and poorer pigment wetting. One would predict that such a mixture would substantially gel when heated to temperatures in excess of 400° F. for durations exceeding an hour.

Unexpectedly we have found that mixtures of high molecular weight alcohols such as hydroabietyl alcohol and abietic acid, derived from rosin, or any of the acidic rosin derivatives enumerated below, are stable at elevated temperatures such as 450° F. We have found that only a simple mixture results, as evidenced by the fact that the physical properties do not deteriorate as would be predicted. This simple mixture exhibits very low initial melt viscosity and shows no signs of significant increase in viscosity after heating for 4 hours at 450° F. When such a mixture is hot compounded with pigments, fillers, glass beads, etc., it continues to have a stable, low viscosity under the same conditions. Further, this material has good wetting properties, good adhesion, high bond strength and high hardness.

The hot melt compositions of this invention are based, in part, on the use of rosin, an acidic derivative of rosin, or combinations thereof. For purposes of this invention, the term acidic derivative of rosin shall mean any product of the modification of rosin which results in a product having an acid number. This definition shall exclude alcohols and alkaline reacting soaps and the like. As is the case in most natural products, rosin is not a pure compound, but is a mixture of mutually soluble materials. Approximately 90 percent of these materials are rosin acids and 10 percent are neutral materials. The acids are generally monobasic and contain some unsaturation. The principal acid is abietic acid.

Because rosin has a relatively low melting point and high acidity, the commercially available forms of rosin are usually modified by one of several chemical processes before it is used in the paint and varnish industry. Such modified rosins, including hydrogenated rosin and dehydrogenated rosin, are suitable for use in this invention. The acidity of rosin may be lowered by esterifying the rosin with an alcohol. If the alcohol has a functionality greater than 2, the melting point of the rosin-alcohol ester will be raised. Ester gum is the trade name applied to the glycerol ester of rosin which has a melting point of 90–105° C., as compared with about 80° C. for rosin. This invention contemplates the use of various ester gums in lieu of or in combination with rosin.

This invention also contemplates the use of the reaction product of various metal compounds and abietic acid, such as that formed by the reaction between the carboxyl group of abietic acid and zinc oxide, to form the zinc resinate. Likewise, the resinates of lead, cobalt, and manganese can be used. This invention also contemplates the use of maleic modified resins. Chemically this embraces the Diels-Alder addition of maleic anhydride to the diene unsaturation of the rosin. Further, reaction products of phenol and formaldehyde, which are referred to as phenolic condensates, can be used to modify rosins. A series of such rosin-modified resins may be made by (1) varying the ratio of condensate to rosin; (2) varying the type of phenol, and the formaldehyde ratio in the condensate; (3) varying the degree of esterification and type of alcohol. Generally speaking 7 to 12 percent of such condensate is used, although higher percentages can be used under some circumstances. Increasing percentages of condensate usually increase the alkali resistance, which may be desirable in connection with some types of pavement.

This invention also contemplates the use of rosin-modified phenolics in which the rosin has been esterified with glycerol, pentaerythritol or another polyhydric alcohol prior to the treatment with the phenol-formaldehyde condensate. Such materials are sometimes referred to as phenolic-modified gum esters.

This invention is also based, in part, on the use of a high molecular weight, high melting point monohydric alcohol. Although it has been found that hydroabietyl alcohol gives superior results, monohydric alcohols having molecular weights between about 220 and 520 are suitable. Such alcohols as stearyl, cetyl-stearyl, cetyl, n-hexacosyl, n-octacosyl, and n-triacontyl are generally useful and are contemplated by this invention. Under some circumstances cholesterol, lanosterol and similar 4,4,14-a-trimethylsterols or cocceryl alcohol or the like may be used. This invention contemplates the use of pure high-molecular weight monohydric alcohols, as described above, as well as the use of mixtures of such alcohols and the use of impure or unrefined alcohols, either alone or mixed with other alcohols.

In producing the hot melt compositions of this invention, it is desirable to use approximately equal amounts (by weight) of rosin and high molecular weight alcohol. However a weight ratio varying from about 2:1 to about 1:2 can be used. Since it is contemplated that the rosin-high molecular weight alcohol combination will comprise between about 10 percent and about 25 percent by weight of the hot melt marking compositions, the rosin (or its derivative) should generally make up between about 5 percent and 12 percent of the marking composition and the high molecular weight alcohol should make up a like amount.

No special mixing techniques or equipment are required. Any mixer capable of heating the material to the 300° to 400° F. range, while at the same time providing agitation, could be used. Since the melting points for all combinations contemplated by this invention are generally similar, mixing temperatures between 300° to 400° F. can be used for all compositions.

As illustrated in the following examples, the thermoplastic resin mixtures may be compounded, while hot, with various modifiers, fillers and pigments. For instance, the use of epoxidized oil, which functions as a low temperature plasticizer, in amounts of up to 2 percent has given improved results. Such low temperature plasticizers are essential for highway marking compositions which are to be subjected to very low temperatures after application, but may be omitted from compositions which are to be used in temperate climates.

Various inert fillers, such as glass beads varying in size from 16 mesh to 400 mesh, may be used in quantities up to 80 percent by weight. Sand fillers, diatomaceous silica, ground marble, either alone or in combination with glass beads may be used in quantities approaching 90 percent by weight.

Likewise pigments of various types may be used as well as stabilizers such as antioxidants and ultraviolet light screening agents.

The following examples will serve to illustrate the preparation of several plastic resin mixtures which are suitable for use and hot melt application highway marking stripes, it is understood that these examples are set forth merely for illustrative purposes and many other thermoplastic resin mixtures are within the scope of the present invention.

EXAMPLE I

A mixture was made of 9.65 parts by weight of hydroabietyl alcohol, 1.0 part by weight of epoxidized oil, and 10.85 parts by weight of maleinized rosin and heated to 350° F. After this has been completely mixed, 22.0 parts by weight of glass beads, 15.9 parts by weight of 50–70 mesh sand, 12.5 parts by weight of titanium dioxide, 20.0 parts of ground Georgia marble which passed through a 325 mesh screen, 6.0 parts of diatomaceous silica, 0.1 part of glass fiber (1/64 inch in length), 0.05 part of 2,6-dioctadecyl-p-cresol, and 0.05 part by weight of a combination ultra violet absorber-antioxidant were added as rapidly as possible, while maintaining a temperature of 350° F. The mixing was continued until the dispersion had been accomplished. The mixture was then drawn off and allowed to cool in conveniently sized blocks. When this composition is tested in accordance with the various commercial tests and compared with specifications set up by the California State Highway Department for thermoplastic highway marking materials, it yields the following results:

TABLE I

| Test | Specification | Result |
|---|---|---|
| Freezing at 15° F. for 24 hrs | No cracks | No cracks. |
| Reflectance relative to MgCO₃ | Min. 75% | 82%. |
| Yellowness Index (color change after 100 hrs. ultra-violet light exposure) | Max. 0.14 | 0.09. |
| Residue after heating 4 hrs. at 400° F | 18% | 13.5%. |
| Residue after heating 4 hrs. at 450° F | 19% | 10.5%. |
| Indentation resistance at 115° F. (Shore A₂ Durometer) | 45-65 | 58. |
| Bond strength to concrete | Min. 150 p.s.i. | 200 p.s.i. |
| Izod impact resistance | Min. 10 in.-lbs | 14 in.-lbs. |
| Specific gravity | 2.5 grams per cc | 2.1 grams per cc. |

EXAMPLE II

Using the mixing procedure outlined in Example I, the following materials were made up into a yellow thermoplastic highway marking composition:

| | |
|---|---|
| Hydroabietyl alcohol | 9.65 |
| Maleinized rosin | 10.85 |
| Epoxidized oil | 1.00 |
| Glass beads (50-70 mesh) | 22.00 |
| Georgia marble (−325 mesh) | 20.00 |
| Diatomaceous silica | 6.50 |
| Coarse sand (50-70 mesh) | 25.92 |
| Titanium dioxide | 2.50 |
| Benzidine orange | 0.08 |
| Benzidine yellow | 1.50 |

The resulting yellow composition had the same good qualities of permanence and application as did the composition of Example I. When subjected to the same tests as are described in Example I, this material gave the following results:

| Test: | Result |
|---|---|
| Freezing @ 15° F. for 24 hrs. | No cracks. |
| Residue after heating 4 hrs. @ 400° F. | 15%. |
| Indentation resistance @ 115° F. | 46. |
| Bond strength to concrete | 200 p.s.i. |
| Izod impact resistance | 14 in.-lbs. |
| Specific gravity | 2.1. |

EXAMPLE III

Using the procedure set down in Example I, the following composition was made up:

| | |
|---|---|
| Hydroabietyl alcohol | 9.0 |
| Maleinized rosin | 9.0 |
| Epoxidized oil | 0.5 |
| Glass beads (40-80 mesh) | 25.0 |
| Titanium dioxide | 13.0 |
| Diatomaceous silica | 2.0 |
| Georgia marble (−325 mesh) | 20.0 |
| Coarse sand (50-70 mesh) | 20.5 |

Tests shows the residue after heating 4 hours at 400° F. to be 14 percent and the indentation resistance at 115° F. to be 60. Thus it can be seen that this composition provides a material with extremely low viscosity, high hardness and high heat stability, while at the same time maintaining high impact strength.

EXAMPLE IV

Using the procedures set down in Example I, the following marking composition was made up:

| | |
|---|---|
| Cetyl-stearyl alcohol | 6.0 |
| Epoxidized oil | 1.0 |
| Rosin | 13.0 |
| Glass beads | 22.0 |
| Titanium dioxide | 10.0 |
| Sand | 24.3 |
| Georgia marble | 20.0 |
| Diatomaceous silica | 3.2 |

This marking composition gave an extremely high indentation resistance as measured with a Shore A₂ Durometer at 115° F., measured value 89, and a 12 percent flow residue at 400° F.

The hot melt compositions of this invention may be applied to roads or highways by any convenient method. Conveniently, a highway stripe may be made by gravity extruding the molten material from a die directly onto the pavement. Other techniques will be apparent to those skilled in the art.

All parts and percentages herein are in terms of weight, unless expressly stated otherwise. All temperatures are given in degrees Fahrenheit, unless otherwise stated.

The forms of invention herein shown and described are to be considered only as illustrative. It will be apparent to those skilled in the art, that numerous modifications may be made therein without departing from the spirit of the invention over the scope of the appended claims.

We claim:
1. A thermoplastic composition suitable for use as a hot-melt highway marking composition, comprising a mixture of a high molecular weight primary alcohol, an acidic rosin derivative, and a material selected from the group consisting of glass beads, pigments, fillers, and mixtures thereof, wherein the high molecular weight alcohol, is selected from the group consisting of hydroabietyl alcohol, stearyl alcohol, cetyl-stearyl alcohol, cetyl alcohol, n-hexacosyl alcohol, n-octacosyl alcohol, and n-triacontyl alcohol, and wherein the rosin derivative is selected from the group consisting of abietic acid, the maleic acid adduct of abietic acid, hydrogenated rosin, dehydrogenated rosin, rosin ester gums, maleic anhydride modifications of rosin ester gums, phenol-formaldehyde condensate modifications of ester gum, and metal resinates.

2. A thermoplastic composition as described in claim 1, where the weight ratio of the high molecular weight alcohol to the rosin derivative is from 2:1 to 1:2.

3. A thermoplastic composition as described in claim 1, wherein the composition includes from about 6 to about 12 percent by weight of high molecular weight alcohol, from about 5 to about 12 percent of rosin derivative, and up to 85 percent of a material selected from the group consisting of glass beads, pigments, and fillers, and mixtures thereof.

References Cited

UNITED STATES PATENTS

| 1,951,593 | 3/1934 | Bradley | 260—103 |
| 2,040,849 | 5/1936 | Holt | 260—103 |
| 3,023,183 | 2/1962 | Nelson | 260—103 |
| 2,802,797 | 8/1957 | Lerch | 260—25 |
| 3,228,900 | 1/1966 | Spellberg et al. | 260—41 |
| 3,377,304 | 4/1968 | Kuester et al. | 260—23 |
| 2,336,983 | 12/1943 | Erickson | 106—237 |

OTHER REFERENCES

Hercules Powder Co., Encyclopedia of Chemical Technology, vol. 11 (pages 779 to 810), 1953.

DONALD E. CZAJA, Primary Examiner

W. E. PARKER, Assistant Examiner

U.S. Cl. X.R.

94—1.5; 106—241; 260—25, 97, 103